United States Patent [19]

Meadows

[11] Patent Number: 5,381,250
[45] Date of Patent: Jan. 10, 1995

[54] ELECTRO-OPTICAL SWITCH WITH 4 PORT MODULES WITH ELECTRO-OPTIC POLARIZATION ROTATORS

[75] Inventor: Michael R. Meadows, Nederland, Colo.

[73] Assignee: Displaytech, Inc., Boulder, Colo.

[21] Appl. No.: 973,163

[22] Filed: Nov. 6, 1992

[51] Int. Cl.$^6$ ............... G02F 1/1335; G02F 1/137
[52] U.S. Cl. .................................. 359/39; 359/42;
359/40; 359/250; 359/246; 359/256; 359/495;
359/117; 359/156; 359/170; 385/11; 385/16;
385/18
[58] Field of Search ............ 359/36, 39, 93, 94,
359/109, 250, 246, 256, 320, 494, 495, 497, 117,
192, 193, 156, 169, 170, 40, 42; 385/14, 16, 17,
18, 20, 11, 36, 47

[56] References Cited

U.S. PATENT DOCUMENTS

| 4,461,543 | 7/1984 | McMahon | 359/42 |
|---|---|---|---|
| 4,474,435 | 10/1984 | Carlsen et al. | 359/320 |
| 4,478,494 | 10/1984 | Soref | 359/42 |
| 4,516,837 | 5/1985 | Soref et al. | 359/42 |
| 4,650,289 | 3/1987 | Kuwahara | 359/484 |
| 4,740,061 | 4/1988 | Miusa | 359/320 |
| 4,948,229 | 8/1990 | Soref | 385/16 |
| 4,989,941 | 2/1991 | Soref | 385/16 |
| 5,162,944 | 11/1992 | Yamamoto et al. | 359/247 |

FOREIGN PATENT DOCUMENTS

| 62-015518 | 1/1987 | Japan . |
|---|---|---|
| 1129227 | 5/1989 | Japan . |
| 3204461 | 9/1991 | Japan . |
| 4051013 | 2/1992 | Japan . |
| 4219718 | 8/1992 | Japan . |
| 4311917 | 11/1992 | Japan . |

OTHER PUBLICATIONS

Translation of Fuji 4051013.
R. A. Soref and D. H. McMahon, Calcite 2×2 optical bypass switch controlled by liquid-crystal cells, Optics Letters, vol. 7, p. 186, Apr., 1982.
R. E. Wagner and J. Cheng, ELectrically controlled optical switch for multimode fiber applications, Applied Optics, vol. 19, No. 17, 1 Sep., 1980.
Richard A. Soref, Low-cross-talk 2×2 optical switch, Optics Letters, vol. 6, p. 275, Jun., 1981.

*Primary Examiner*—William L. Sikes
*Assistant Examiner*—Kenneth Parker
*Attorney, Agent, or Firm*—William E. Hein

[57] ABSTRACT

A family of optical switches employ dielectric film polarizing beam splitters and switchable electro-optic retarder to produce 2×2 optical switches which exhibit low crosstalk characteristics while switching unpolarized or linearly polarized collimated light. The switches all contain four port modules through which light enters and leaves the switch. The port modules utilize polarizing beam splitters to separate incoming light into two orthogonal linearly polarized components. The component beams are made parallel after which each passes through an electro-optic retarder. The retarders are electrically driven so as to selectively change the polarization of either one of the two component beams, thus making the polarizations the same. Other polarizing beam splitters are disposed to direct the component beams along one of two pairs of paths as determined by their common polarization. The pairs of paths associated with each of the port modules are positioned and aligned in two sets of pairs, and the electro-optic retarders of the four port modules are jointly controlled electrically so that light entering the switches through any one port can be switched to selectively leave through either of two of the remaining ports. The two ports not thus connected as the foregoing pair are themselves connected so that light may pass between them.

35 Claims, 16 Drawing Sheets

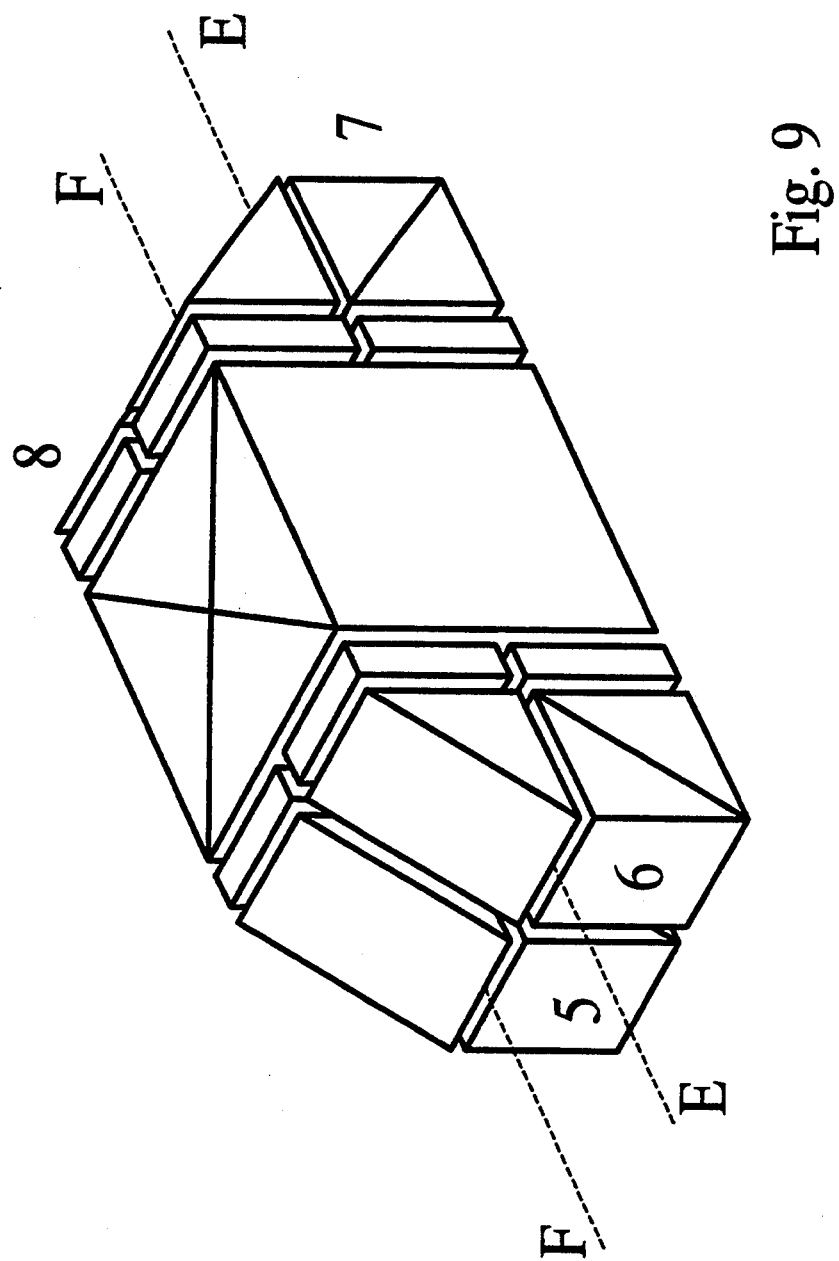

ELECTRO-OPTICAL SWITCH WITH 4 PORT MODULES WITH ELECTRO-OPTIC POLARIZATION ROTATORS

ORIGIN OF THE INVENTION

This invention was made with United States government support under contract N00163-89-C-0137 awarded by the Department of the Navy. The United States government has certain rights to this invention.

BACKGROUND AND SUMMARY OF THE INVENTION

This invention relates generally to optical switches employed in communications and other applications for routing beams of optical radiation and, more particularly, to an optical switch employing electro-optic material in the form of a retarder and dielectric polarizing beam splitter films in such a manner as to provide a switch having low crosstalk characteristics.

An elementary building block for optical switching consists of the fully symmetrical 2×2 switch. The switch includes four ports through which light may enter or exit, and it exhibits two distinct states. Each state connects the four ports in two disjoint pairs. Thus, for example, in one state ports one and four are connected by an optical path while simultaneously ports two and three are connected by another optical path. In the other state, ports one and two are connected by an optical path, while ports three and four are connected by still another optical path. Such a switch is fully symmetrical in that the optical paths are fully bi-directional, and the ports are indistinguishable. Aside from these topological considerations is the question of what type of light can be switched. The most general switch design can operate with unpolarized light beams. Other switch designs are only capable of switching light having a particular state of polarization, usually linearly polarized. Such 2×2 switches have a wide variety of applications ranging from simple on-off switching to the combination of many such switches into switching arrays or crossbars. There is a need, in particular, for such switches in the field of fiber optic communications where it is necessary to switch unpolarized light.

Three characterisitcs of 2×2 switches are of particular importance in constructing practical optical switches. These are 1) the amount of time required to switch from one state to the other, i.e. the switching time; 2) the fraction of the input light that exits from the wrong or unselected port, i.e. the crosstalk; and 3) the fraction of the input light that fails to exit from the selected port, i.e. the insertion loss. Different practical switch designs differ as to the values of these characteristics which thus limit the range of their potential applications. There are also applications which do not require the full symmetry of the 2×2 switch, and practical switch designs can thus sacrifice some aspect of the full symmetry to achieve enhanced values for one or more of these three characteristics.

The original electro-optic switch related to the present invention is described by R. E. Wagner and J. Cheng, Appl. Opt. 19, 2921 (1980). This teaching was the first to show how to use bulk optics in the form of passive polarizing beam splitters made with dielectric films together with an electro-optic retarder comprising a nematic liquid crystal film to make a 2×2 switch capable of switching nearly all of the light among multimode optical fibers. Switches based on this prior art design generally switch in 10 milliseconds and exhibit, at best, −20 dB of crosstalk. The insertion loss of this design depends on the source of the input beam, being somewhat better than −1 dB for a well collimated laser beam or as much as a few dB for light from an optical fiber that has been collimated with a gradient index rod lens.

The later prior art teachings of R. A. Soref, Opt. Lett. 6, 275 (1981) illustrated the way in which a compound switch exhibiting a low crosstalk characteristic can be formed by cascading four simple switches having a higher crosstalk characteristic. Thus, cascading simple switches having a −20 dB crosstalk characteristic can produce a compound switch exhibiting a −40 dB crosstalk characteristic. The number and cost of the parts required for constructing such a compound switch are, however, both high. The crosstalk was −27 dB for Soref's prototype switch, and the switching time remained about 10 milliseconds, since he employed a nematic liquid crystal retarder. The insertion loss was large, in part because the more complicated switch possessed a greater number of reflection losses. Still later, the teachings of R. A. Soref and D. H. McMahon, Opt. Lett. 7, 186 (1982) described a low crosstalk switch in which the polarizing beam splitter films were replaced with a configuration of three calcite prisms. Although the crosstalk characteristic of this prior art switch improved to −32 dB for switching laser beams, the switch was not fully symmetric, and the considerable cost of the calcite made it very expensive. The switching time of this switch was also about 10 milliseconds, while the insertion loss was about −3 dB. Still later, U.S. Pat. No. 4,948,229 to Soref taught another 2×2 switch that employs a fast-switching ferroelectric liquid crystal retarder, and its crosstalk characteristic can be shown to be in the −20 dB range.

Despite these prior art attempts to construct an improved optical switch, there remains today a need for a 2×2 optical switch that uses a small number of inexpensive parts and that exhibits a crosstalk characteristic better than −20 dB.

It is therefore a principal object of the present invention to provide such an optical switch that may be constructed from a small number of inexpensive parts and that exhibits a low crosstalk characteristic. This and other objects are accomplished in accordance with the illustrated preferred embodiments of the present invention by arranging electro-optic retarders and polarizing beam splitters in novel configurations.

BRIEF DESCRIPTION OF THE DRAWINGS

FIG. 9 is a schematic representation of a second low crosstalk electro-optical switch in accordance with the present invention.

DETAILED DESCRIPTION OF THE PREFERRED EMBODIMENTS

Figure 2:
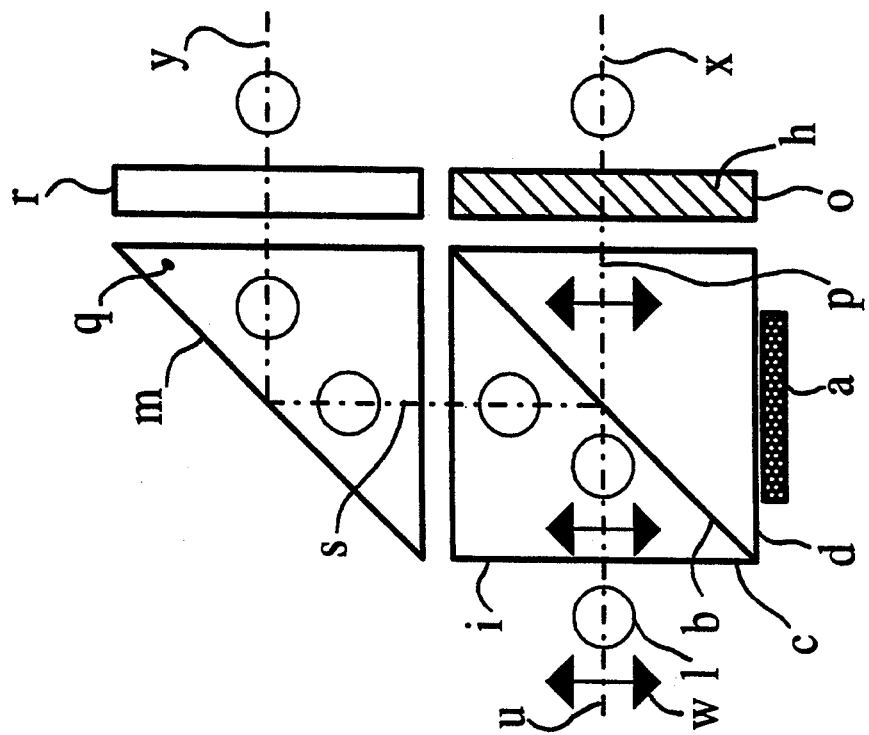
FIG. 2 is a schematic representation of the port module component of the present invention illustrating the second of its two useful states.

The present invention relates to a family of 2×2 optical switches which employ electro-optic retarders (EOR) and polarizing beam splitter (PBS) films in novel configurations to route light among four input/output ports. The input light consists of polarized or unpolarized collimated light beams which may be provided via any of a variety of well known means, particularly beams which are provided by collimating the light from an optical fiber by means of a conventional optical lens, a micro-optic lens, a gradient index lens or a holographic optical element, but also other light beams which are already or which can be collimated. An EOR consists of an electro-optic material held between a pair of transparent electrically conductive electrodes which are in turn attached to signal leads whereby electrical signals may be applied to the electro-optic material. The electro-optic material may be comprised of nematic liquid crystals, ferroelectric liquid crystals or of other materials which can provide retarders that can be switched by applied electrical signals. The electo-optic retarders are switchable half-wave plates which serve a single function. They are employed in such a manner that they act on a linearly polarized beam which passes through them so as to either leave the beam's linear polarization unchanged or to change it to the orthogonal linear polarization state according to the electrical signal that is applied to the retarder. The principles and methods for constructing and employing such switchable half-wave retarders are well known.

The polarizing beam splitter films consist of dielectric thin films applied to the interface between solid prisms. The prisms may be made of any optically transparent material such as glass or plastic. The principles and methods for constructing and employing PBS films are well known. In the switches described herein, the PBS films serve one of three functions. In the first function, a PBS film separates an unpolarized beam into two component beams with orthogonal linear polarizations which travel in different directions, typically separated by 90 degrees. In fulfilling the first function, the PBS film transmits a first linearly polarized component beam in which the electric field vibrates in the plane containing both the direction of propagation of the incident beam and the normal to the plane of the PBS film. This first component beam is said to have p-polarization relative to the PBS film. The PBS film also reflects a second linearly polarized component beam in which the electric field vibrates in a direction perpendicular to the plane containing the direction of propagation of the incident beam and the normal to the plane of the PBS film. This second component beam is said to have s-polarization relative to the PBS film. In the second function, a PBS film directs linearly polarized beams along one of two paths according to the beams' polarizations. Thus, a linearly polarized beam having p-polarization relative to the PBS film is transmitted by the PBS film. A linearly polarized beam having s-polarization relative to the PBS film is reflected by the PBS film. In the third function, a PBS film combines two beams with orthogonal, linear polarizations into a single beam. Thus, if an s-polarized beam and a p-polarized beam are both incident on the same position of a PBS film, the p-polarized beam will be transmitted and the s-polarized beam will be reflected. Furthermore, if the angle of incidence of the s-polarized beam is such that its propagation direction after reflection becomes the same as the transmitted p-polarized beam, then the two beams are thereby combined into a single beam.

The PBS and EOR of the present invention are combined in particular combinations to provide the desired switching function. In general, each input/output port is associated with one PBS and two EORs. The collimated input light is first separated into linearly polarized component beams by a PBS fulfilling the first PBS function. The beams are then made to travel parallel paths by inserting a mirror into the path of one beam. These component beams then each impinge on an EOR which acts on the beam's polarization, controlling it according to the electrical signal applied to the EOR. The signals applied to the EORs are correlated so that the beams emerge from the EORs traveling parallel paths and both have one of two possible directions of linear polarization, which direction can be changed by exchanging the signals applied to the two EORs. The beams next impinge on the other PBS film(s), fulfilling the second PBS function which is to direct the beams along one of two sets of parallel paths. The set of parallel paths along which the beams are directed depends upon the polarization of the beams and therefore upon the polarization that has been selected by the EORs. Each set of paths is aligned coaxially with the set of paths which is associated with one of the other input/output ports. These other ports thus function as selectable outputs at which the light in the parallel paths is recombined in a single output beam by a PBS fulfilling the third PBS function. The arrangements of PBS and EOR that are taught herein permit the construction of electro-optical switches from fewer parts than prior art switches. Moreover, the switches of the present invention exhibit a lower crosstalk characteristic than those constructed in accordance with the teachings of the prior art.

Port Module

Figure 1:
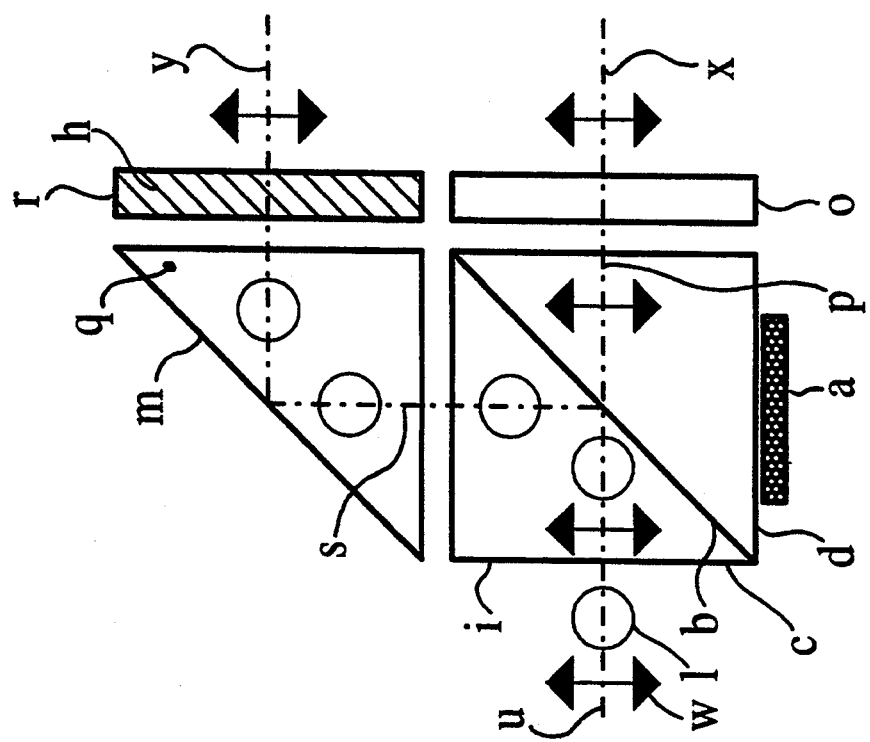
FIG. 1 is a schematic representation of the port module component of the present invention illustrating the first of its two useful states.

Referring now to FIG. 1, there is shown a plan view of a port module subassembly employed in the electro-optical switches of the present invention. The port module comprises four main components that include a polarizing beam splitting film b, a reflector m and two switchable retarders o and r. All four are planar components and have their planes oriented perpendicular to the plane of the drawing figure. In the illustrated preferred embodiment, the film b is part of a polarizing beam splitter cube prism c; the reflector m is the hypotenuse of a right angle prism q; and the switchable retarders o and r comprise liquid crystal layers held between transparent conductive electrodes. Retarders o and r may either comprise entirely separate retarders, or they may be separately controllable regions of a single liquid crystal layer constructed in accordance with well known art pertaining to the fabrication of such retarders. An unpolarized collimated light beam u lies in the plane of the drawing figure, and it enters and leaves the port module through face i of cube prism c. Face d serves as a beam dump with optional optical absorber a acting to eliminate light that passes through face d from inside prism c. It is to be understood that the components illustrated in FIG. 1 all have extent in the direction perpendicular to the plane of the drawing figure and thereby accommodate light beams of finite cross section. Since each switchable retarder is capable of two possible states, the port module itself is capable of four possible states. Two of the four possible port module states are used in the switches disclosed herein. In both port module states, the two retarders o and r have opposite retarder states. FIG. 1 illustrates the first port module state, and FIG. 2 illustrates the second port module state. Each port module can function as an input port and as an output port as described below.

Operation of the port module as an input port may be understood with further reference to FIG. 1. The unpolarized light beam u enters face i and encounters film b which transmits a linearly polarized portion as beam p. The electric field of beam p lies in the plane of the drawing figure as indicated by the double-headed arrows w. Beam p then is incident on retarder o at nominally normal incidence. Retarder o transmits beam p to become beam x. In FIG. 1, retarder o has been driven to the second retarder state by conventional electrical driving apparatus not shown, thereby causing the electric field of transmitted beam x to lie in the plane of the drawing figure. Film b also reflects a second linearly polarized portion as beam s. The electric field of beam s is perpendicular to the plane of the drawing figure as indicated by the circles 1. Beam s travels to reflector m where it is reflected to become parallel to beam p. Beam s then is incident on retarder r at nominally normal incidence. Retarder r transmits beam s to become beam y. In FIG. 1, retarder r has been driven to the first retarder state, as indicated by hatching h, again by conventional electrical driving apparatus not shown, thereby changing the polarization of incident beam s to cause the transmitted beam y to have linear polarization lying in the plane of the drawing figure. The consequence of the operation of the port module in the first state is that the unpolarized input beam u is divided into two parallel output beams x and y having common polarization with their electric fields lying in the plane of the drawing figure. In the second port module state shown in FIG. 2, the unpolarized beam u enters face i and encounters film b which transmits a linearly polarized portion as beam p whose electric field lies in the plane of the drawing figure. Beam p then is incident upon retarder o at nominally normal incidence. Retarder o has been driven to the first retarder state as indicated by hatching h, thereby changing the polarization of incident beam p, causing the electric field of transmitted beam x to be perpendicular to the plane of the drawing figure. Film b also reflects a second linearly polarized portion as beam s whose electric field is perpendicular to the plane of the drawing figure. Beam s travels to mirror m where it is reflected to become parallel to beam p. Beam s then is incident upon retarder r at nominally normal incidence. Retarder r has been driven to the second retarder state, and it leaves the electric field of transmitted beam y perpendicular to the plane of the drawing figure. The consequence of the operation of the port module in the second state is that the unpolarized input beam u has been divided into two parallel output beams x and y having common polarization with their electric fields perpendicular to the plane of the drawing figure.

The port module also operates as an output port. The well known principle of reversibility in optics states that an optical process can be reversed by changing the direction of propagation of the optical beams involved. This principle applies to the port module. Thus, operation of the port module to separate the beam u of unpolarized light into two parallel beams x and y of linearly polarized light can be reversed to become the operation that combines two parallel beams x and y of linearly polarized light to yield a single beam u. Thus, only the directions of the beams x, y, p, s, and u in FIGS. 1 and 2 determine whether the illustrated port module represents an input port or an output port.

Figure 3:
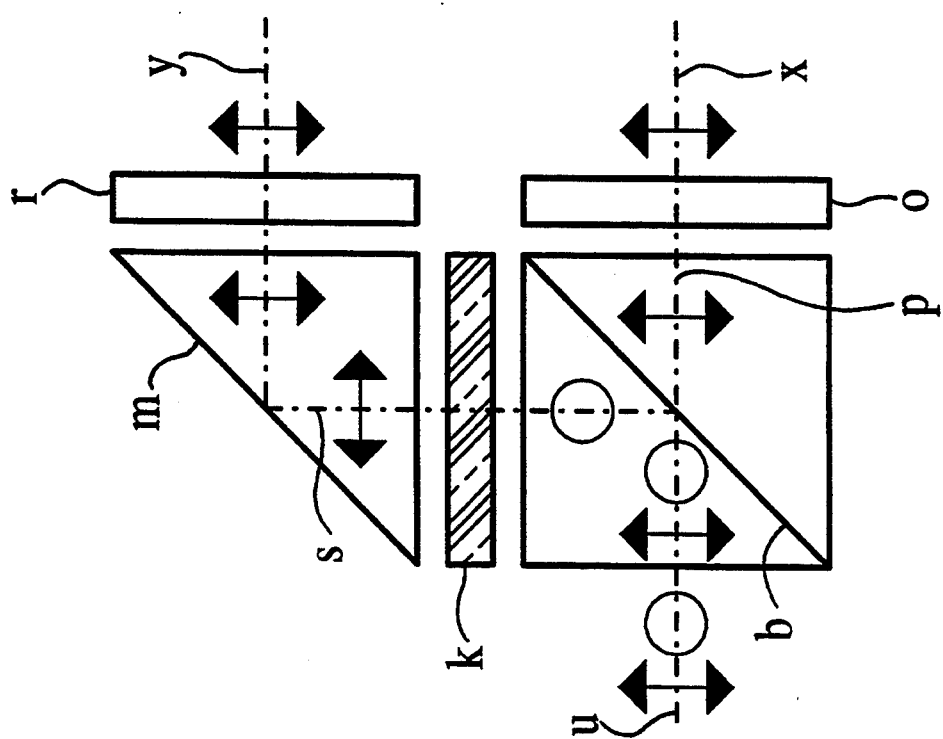
FIG. 3 is a schematic representation of an augmented port module in accordance with the present invention.

The port module of FIGS. 1 and 2 may be modified so that it makes use of the other two possible port module states. These states both require the switchable retarders to be in the same state. The modified port module, which is called the augmented port module, is illustrated in one of its two states in FIG. 3. The modification consists of the addition of a fixed half-wave retarder k operative for intercepting one of the polarized beams s or p between polarizing beam splitter b and the switchable retarder r or o, respectively. The fixed retarder is constructed and oriented in the port module so that it changes the polariztion of the beam to the orthogonal polarization. In FIG. 3, retarder k is shown inserted into beam s, thereby causing the light in beam s to have the same direction of linear polarization as the light in beam p. FIG. 3 also shows that both switchable retarders r and o have been driven into the second retarder state. Thus, both beams s and p are transmitted with their polarization unchanged. If both switchable retarders are driven to the second retarder state, then both beams s and p would have their polarizations changed to the orthogonal state. In both of these possible states, the beams y and x which emerge from the switchable retarders have the same state of polarization. Consequently, this modified port module is capable of providing the same function that is provided by the standard port module of FIGS. 1 and 2.

Figure 5:
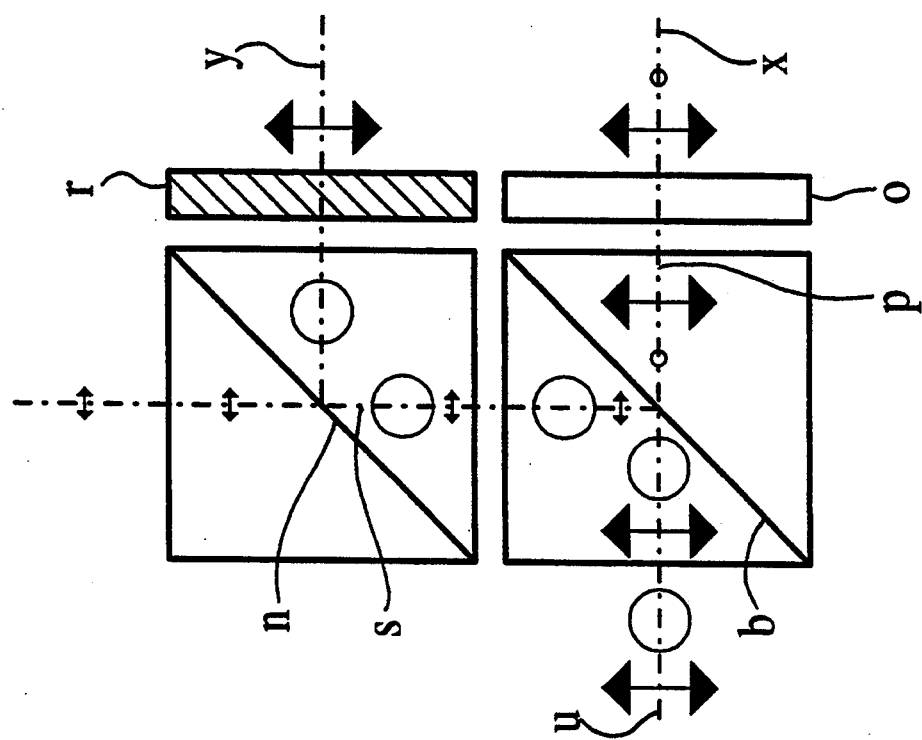
FIG. 5 is a schematic representation of the second type of repolarized port module component in accordance with the present invention.
Figure 4:
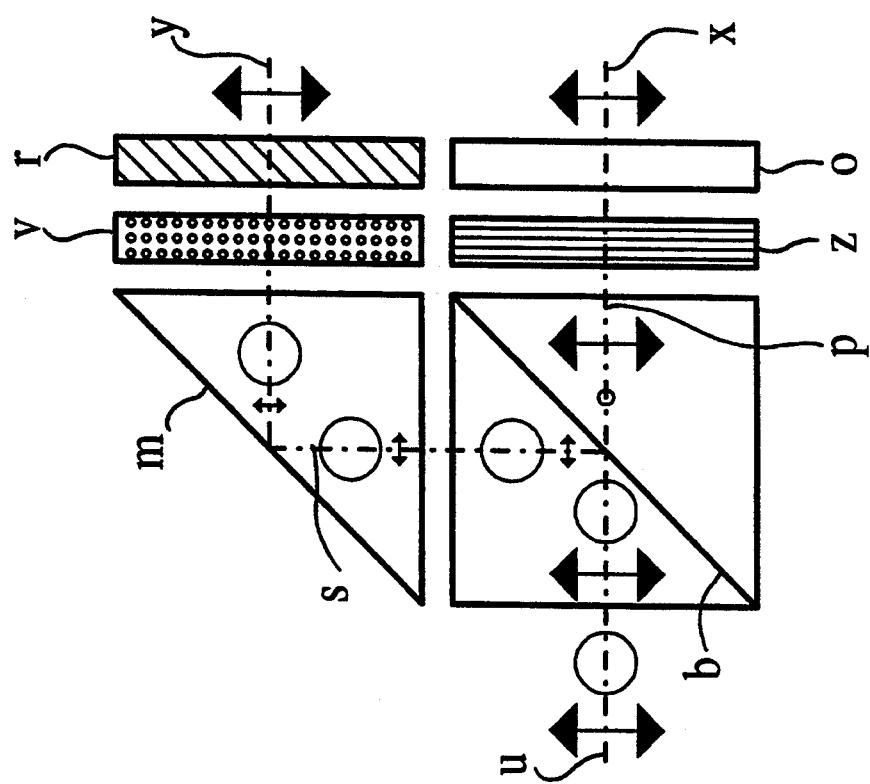
FIG. 4 is a schematic representation of the first type of repolarized port module component in accordance with the present invention.

Much of the crosstalk in an optical switch of the type disclosed herein arises from imperfect operation of the PBS films, as has been observed by Wagner and Cheng, supra. In particular, it is well known that practical PBS films reflect a small but significant fraction of the incident p-polarized light which should all be transmitted. Thus, the reflected component of an incident unpolarized beam will contain a portion of p-polarized light. Practical PBS films also transmit a small fraction of the incident s-polarized light which should all be reflected, and while this will create crosstalk, a smaller fraction of s-polarized light is transmitted and it is therefore less serious than the reflection of p-polarized light. One method of reducing crosstalk is therefore to modify the port module by positioning one or more polarizing elements in the paths of the component beams between the PBS film and the EORs. Such a modified port module is called a repolarized port module, and there are two preferred methods for accomplishing the modification. FIG. 4 illustrates a first method, in which a linear polarizer v is placed between reflector m and retarder r for removing the p-polarized light from beam s while transmitting s-polarized light. Similarly, linear polarizer z is placed between PBS film b and retarder o for removing s-polarized light from beam p while transmitting p-polarized light. Since p-polarized light in beam s creates the most crosstalk, polarizer v may be used to good effect without polarizer z. The linear polarizers v and z are shown schematically, and it is understood that any linear polarizing means may be employed, whether appropriately oriented PBS films, dichroic sheet polarizers or polarizer of the Polacor ™ type sold by Corning Glass Company of Corning, N.Y. Referring now to FIG. 5, there is shown a second method for repolarizing the port module in which mirror m has been replaced by PBS film n. The film n removes p-polarized light from beam s by transmitting it, while it reflects s-polarized light.

Normal Planar Switch

Figure 6:
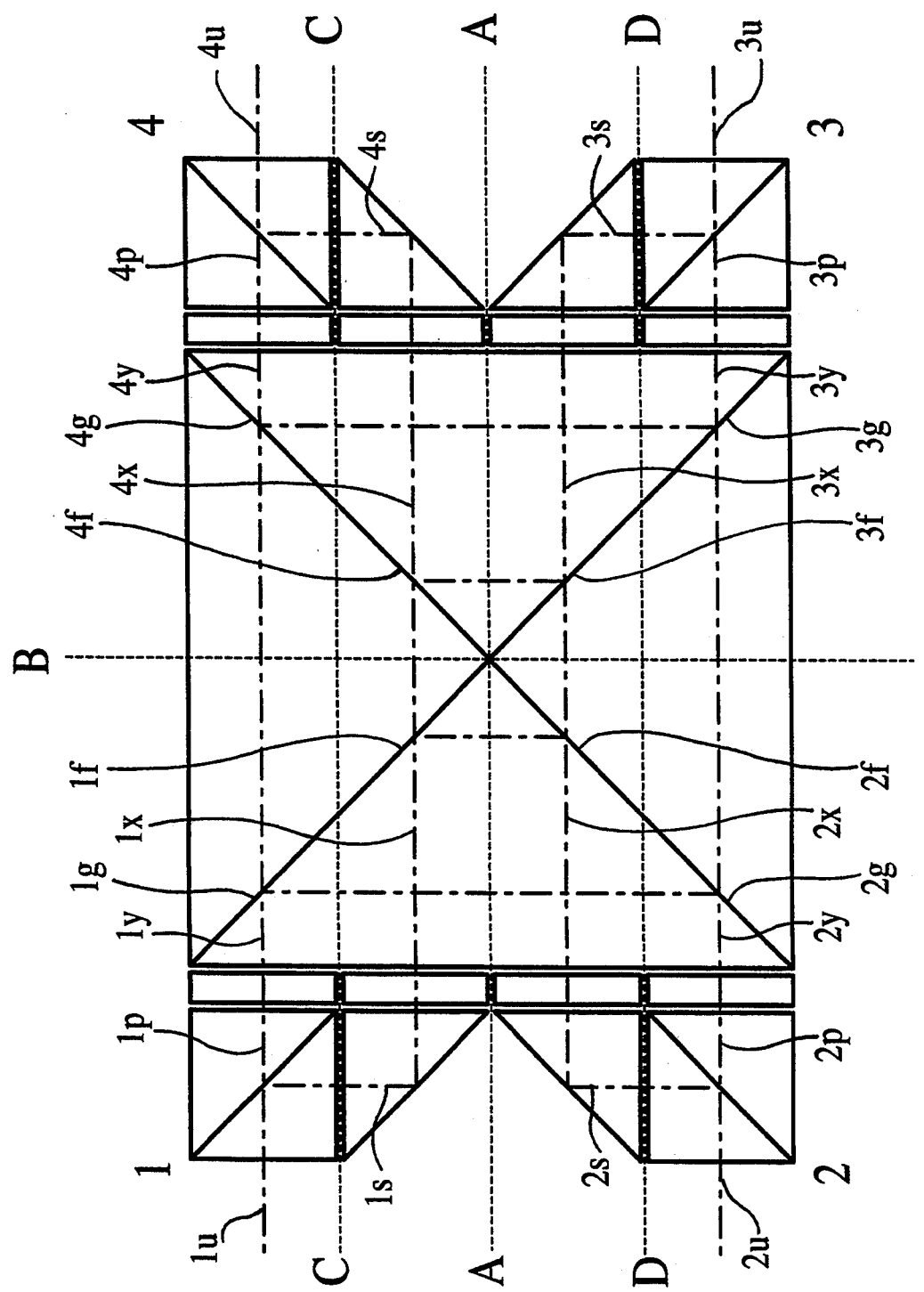
FIG. 6 is a schematic representation of a first low crosstalk electro-optical switch in accordance with the present invention.

Referring now to FIG. 6, there is shown a schematic representation of a section through the mid-plane of an optical switch in accordance with a preferred embodiment of the present invention that is termed a normal planar switch. Four port modules 1, 2, 3, and 4 are positioned so that the parallel output beams 1x and 1y of port i are collinear with the output beams 4x and 4y of port 4, while the parallel output beams 2x and 2y of port 2 are collinear with the output beams 3x and 3y of port 3, all of the output beams having parallel axes which lie in the same plane. Ports 1 and 4 are said to be opposed, as are ports 2 and 3. Ports 1 and 2 are said to be adjacent, as are ports 3 and 4. The eight components designated 1f, 1g, 2f, 2g, 3f, 3g, 4f, and 4g are all polarizing beam splitter films which are called directors. The directors are planar films which are perpendicular to the plane of the drawing figure. Each director film is associated with one output beam of one port module. Film 1f is associated with output beam 1x, film 1g with 1y, film 2f with 2x, film 2g with 2y, film 3f with 3x, film 3g with 3y, film 4f with 4x, and film 4g with 4y. Each film is oriented with the direction perpendicular to its plane at 45 degrees to the axis of its associated beam and so that any portion of its associated beam which is refelected from the film will remain in the plane of the drawing figure. The films are moreover mutually positioned in pairs in such a way that the portion of the associated beam which is reflected from each film is collinear with the reflected portion of a component beam of the adjacent port. As illustrated in FIG. 6, the portion of beam 1x which is reflected from film 1f is collinear with the portion of beam 2x that is reflected from film 2f, and the portion of beam 1y which is reflected from film 1g is collinear with the portion of beam 2y that is reflected from film 2g. The portion of beam 3x which is reflected from film 3f is collinear with the portion of beam 4x that is reflected from film 4f, and the portion of beam 3y which is reflected from film 3g is collinear with the portion of beam 4y that is reflected from film 4g.

Figure 7:
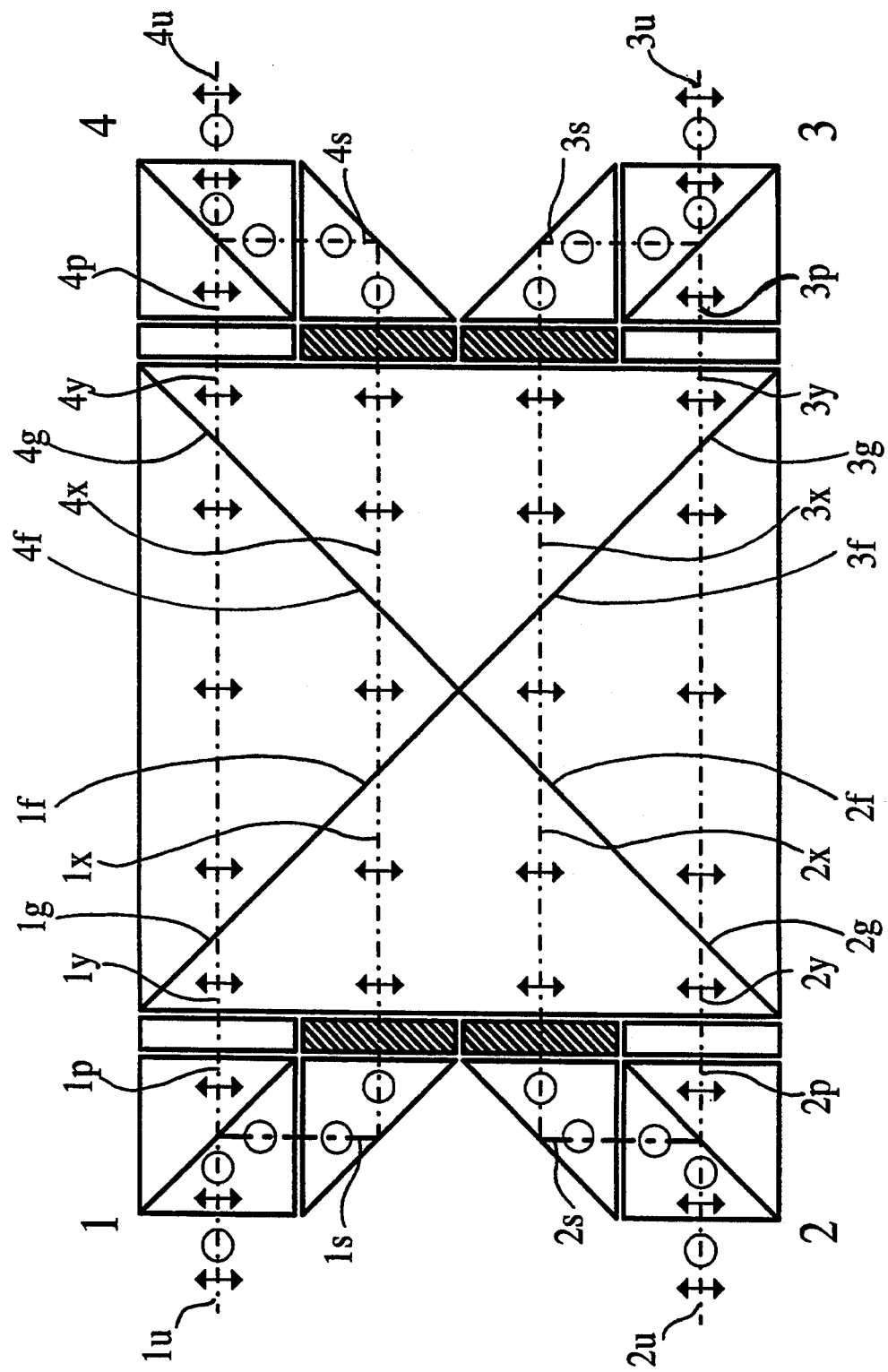
FIG. 7 is a schematic representation of the low crosstalk electro-optical switch of FIG. 6 showing the routing of light beams through the switch when it is placed in the first of its two useful states.
Figure 8:
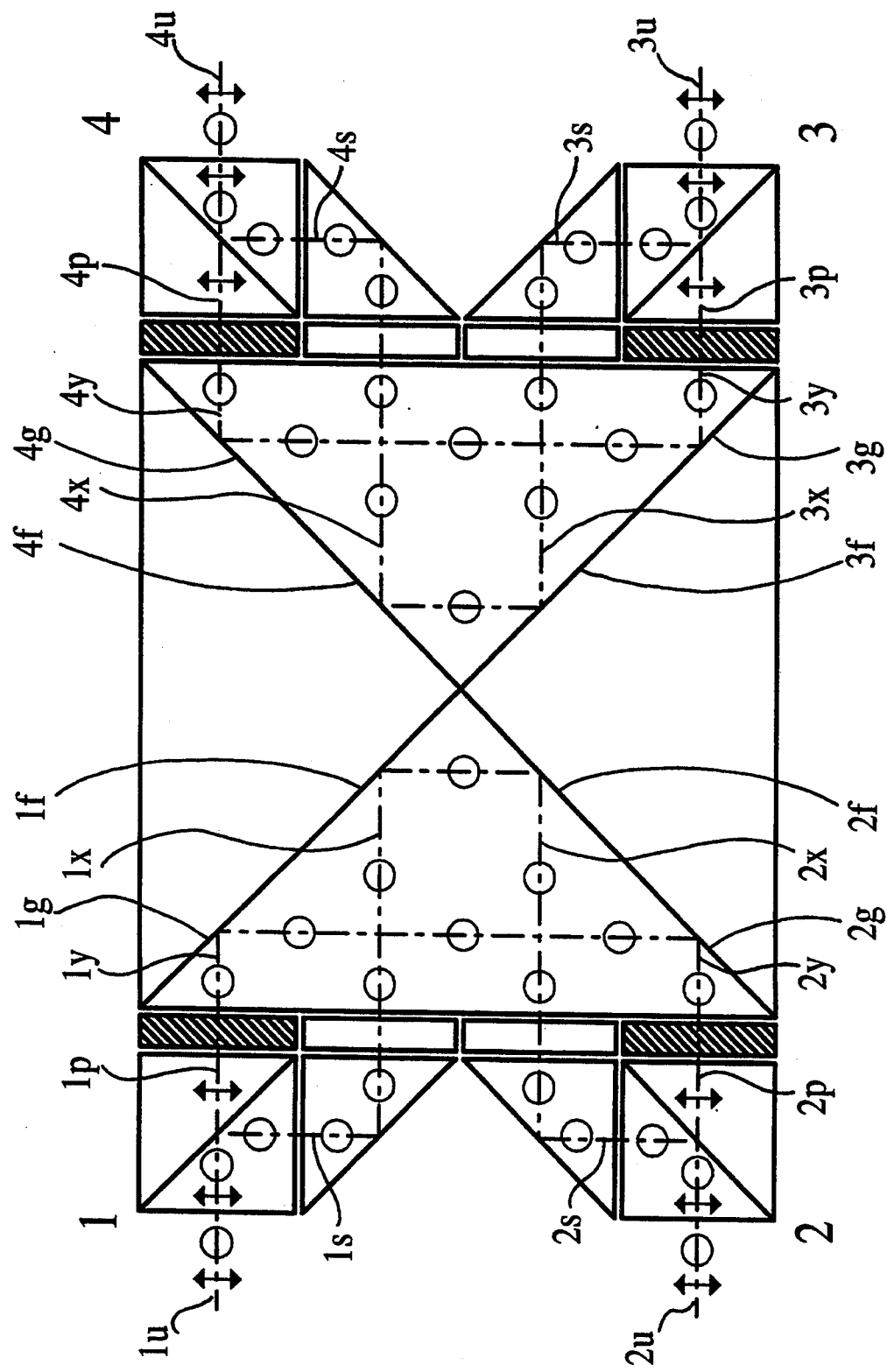
FIG. 8 is a schematic representation of the low crosstalk electro-optical switch of FIG. 6 showing the routing of light beams through the switch when it is placed in the second of its two useful states.

Since the normal planar switch contains four port modules, and since each port module is capable of two port module states, the switch itself is capable of sixteen possible switch states. The present invention employs two particular states of these sixteen possible switch states to provide the 2×2 switching function. In the first switch state, illustrated in FIG. 7, all eight beams 1x, 1y, 2x, 2y, 3x, 3y, 4x, and 4y are linearly polarized with their electric fields all lying in the plane of the drawing figure. This being the case, directors 1f and 1g transmit component beams 1x and 1y, while directors 4f and 4g transmit component beams 4x and 4y. Similarly, directors 2f and 2g transmit component beams 2x and 2y, while directors 3f and 3g transmit component beams 3x and 3y. Thus, ports 1 and 4 are connected optically as are ports 2 and 3. In the second switch state, illustrated in FIG. 8, all eight beams 1x, 1y, 2x, 2y, 3x, 3y, 4x, and 4y are linearly polarized with their electric fields all perpendicular to the plane of the drawing figure. This being the case, directors 1f and 1g reflect component beams 1x and 1y, while directors 4f and 4g reflect component beams 4x and 4y. Similarly, directors 2f and 2g reflect component beams 2x and 2y, while directors 3f and 3g reflect component beams 3x and 3y. Thus, ports 1 and 2 are connected optically as are ports 3 and 4.

It is a characteristic of the normal planar switch that each possible connection between two ports is made via two component paths, and that the two paths have different path lengths. Thus, for example, in the case of the connection between ports 1 and 4 of FIG. 6, the path 1u-1p-1y-4y-4p-4u is shorter than the path 1u-1s-1x-4x-4s-4u. Similarly, in the case of the connection between ports 1 and 2 of FIG. 8, the path 1u-1p-1y-2y-2p-2u is shorter than the path 1u-1s-1x-2x-2s-2u. This difference can be made very small, but in the application of the switch to signals of sufficiently high frequency, the difference in path length will cause degradation of the signals. This difference in path length can be eliminated in a simple manner if port module 1 is rotated by 180 degrees about the line C—C which is equidistant between beams 1x and 1y, while port module 3 is rotated by 180 degrees about the line D—D which is equidistant between beams 3x and 3y. By making this change, beam 1x becomes collinear with beam 4y, while beam 1y becomes collinear with beam 4x, and the two paths 1u-1p-1y-4x-4s-4u and 1u-1s-1x-4y-4p-4u which then connect ports 1 and 4 have equal length. Similarly, the reflected portion of beam 1x becomes collinear with the reflected portion of beam 2y, while the reflected portion of beam 1y becomes collinear with the reflected portion of beam 2x, and the two paths 1u-1p-1y-2x-2s-2u and 1u-1s-1x-2y-2p-2u which then connect ports 1 and 2 have equal length. Such a switch is said to be equalized.

Dihedral Switch

A second preferred embodiment of the electro-optical switch of the present invention may be formed from the normal planar switch. It is called the dihedral switch and is formed from the normal planar switch of FIG. 6 by making three changes in the components. The first change is to rotate port modules 1 and 4 by 90 degrees about the dashed line C—C which is equidistant between beams 1x and 1y. The second change is to rotate port modules 2 and 3 by 90 degrees about the dashed line D—D which is equidistant between beams 2x and 2y. The rotations are performed so as to make all four right angle prisms of the port modules lie on the same side of the plane of FIG. 6. The third change is to translate all eight directors in space and position them so that each again intercepts its associated component beam and so that the reflected portions of the associated beams are again collinear as described above for the normal planar switch. The dihedral switch produced in this manner is shown in the three-dimensional schematic diagram of FIG. 9.

Figure 10A:
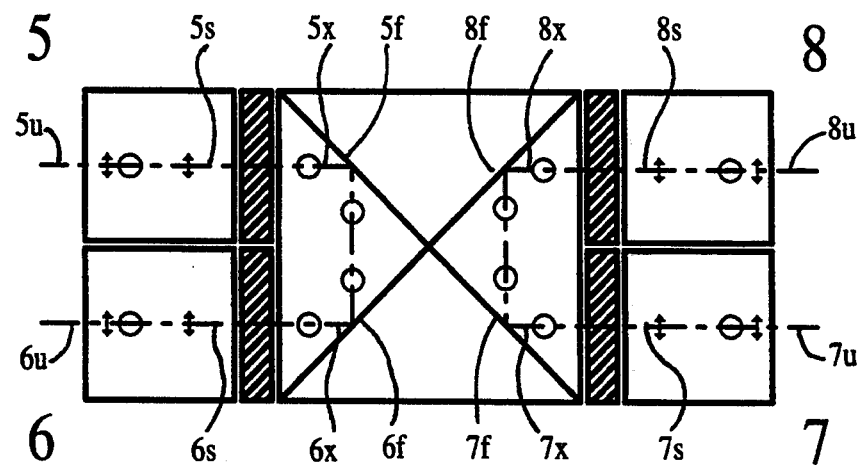
FIGS. 10a-c are a schematic representation of the electro-optical switch of FIG. 9 showing the routing of light beams through the switch when it is placed in the first of its two useful states.
Figure 10B:
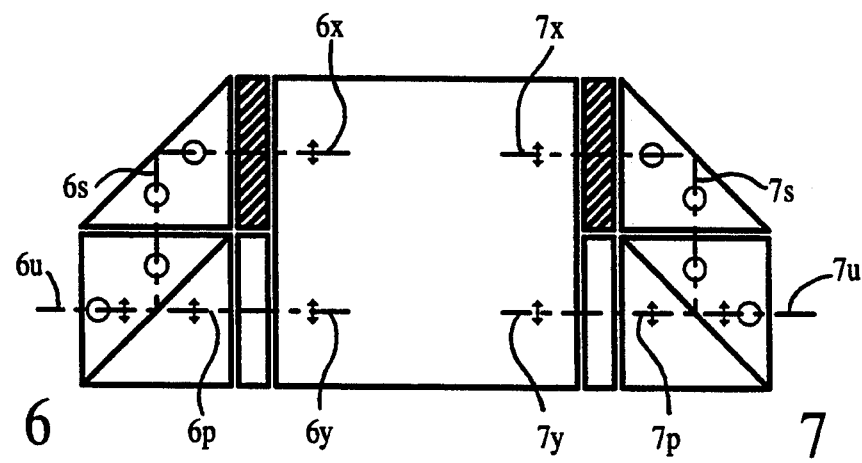
Figure 10C:
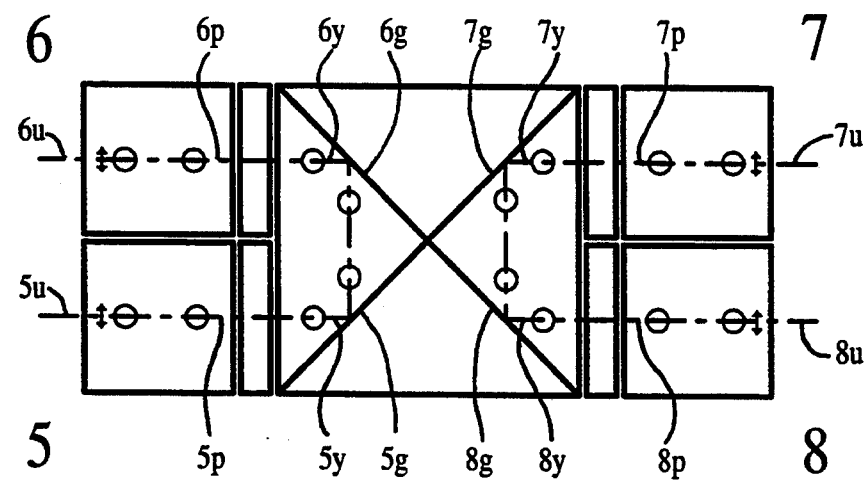
Figure 11A:
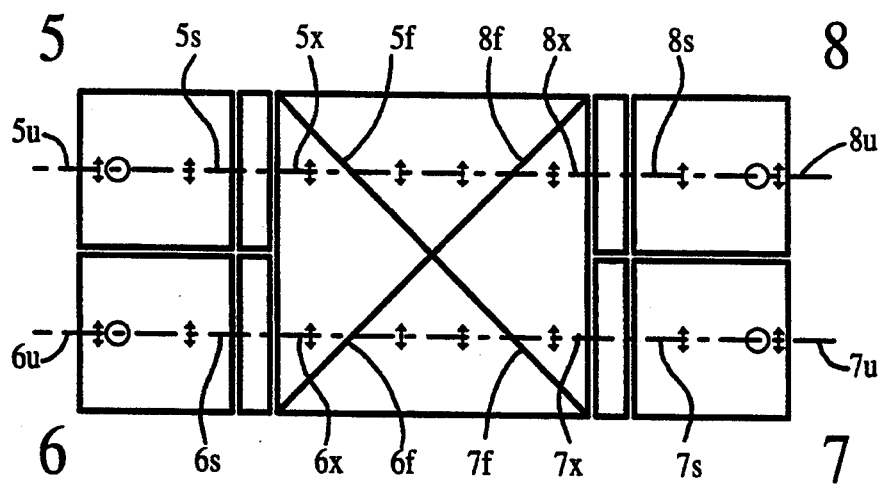
FIGS. 11a-c are a schematic representation of the electro-optical switch of FIG. 9 showing the routing of light beams through the switch when it is placed in the second of its two useful states.
Figure 11B:
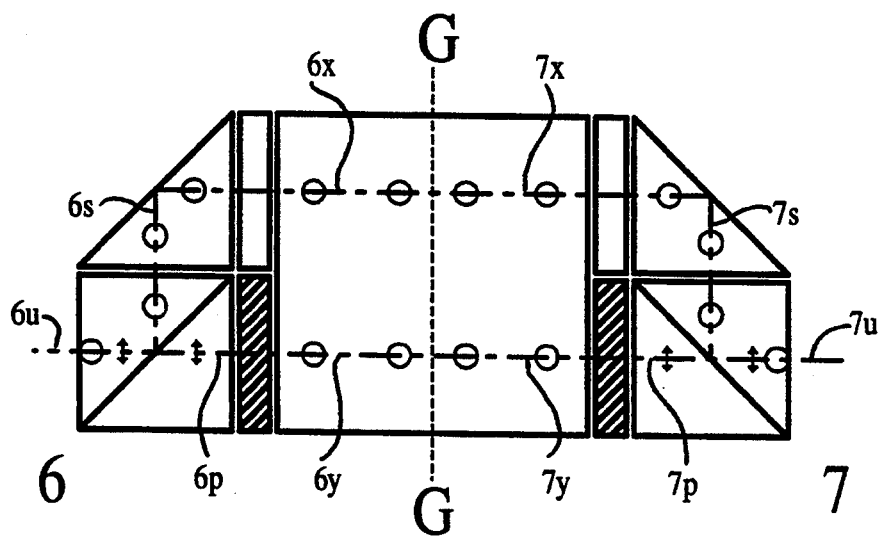
Figure 11C:
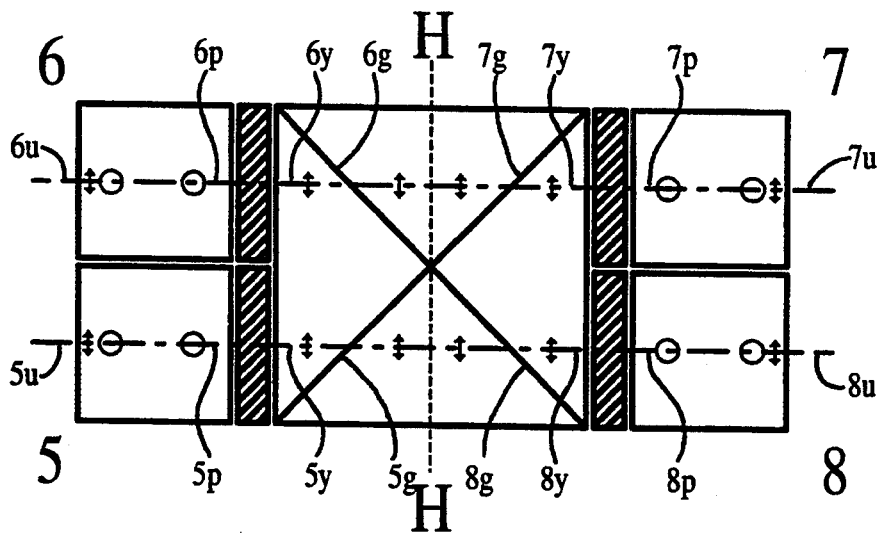

Since the dihedral switch contains four port modules, and since each port module is capable of two port module states, this switch also is capable of sixteen possible switch states. As for the normal planar switch, the dihedral switch employs two particular states of these sixteen possible states to provide the 2×2 switching function. The first switch state is shown in FIGS. 10a–c. FIG. 10a shows a top view; FIG. 10b shows a front view; and FIG. 10c shows a bottom view, the same reference labels being used in all three views to designate like components. In this switch state, the port module states are selected to make all eight beams 5x, 5y, 6x, 6y, 7x, 7y, 8x, and 8y linearly polarized with their electric fields all lying in the plane of FIG. 10b. This being the case, each of the eight directors reflects its associated component beam. Directors 5f and 5g reflect component beams 5x and 5y, connecting them to component beams 6x and 6y which are reflected by directors 6f and 6g. Similarly, directors 7f and 7g reflect component beams 7x and 7y, connecting them to component beams 8x and 8y which are reflected by directors 8f and 8g. Thus, ports 5 and 6 are connected optically as are ports 7 and 8. The second switch state is shown in FIGS. 11a–c, with FIG. 11a being a top view, FIG. 11b being a front view, and FIG. 11c being a bottom view. The same reference labels are used in each of the three views to designate the same components and are consistent with the reference labels used in FIGS. 10a–c. In this switch state, the port module states are selected to make all eight beams 5x, 5y, 6x, 6y, 7x, 7y, 8x, and 8y linearly polarized with their electric fields all perpendicular to the plane of FIG. 11b. This being the case, each of the eight directors transmits its associated component beam. Directors 5f and 5g transmit component beams 5x and 5y, connecting them with component beams 8x and 8y which are transmitted by directors 8f and 8g. Similarly, directors 6f and 6g transmit component beams 6x and 6y, connecting them with component beams 7x and 7y which are transmitted by directors 7f and 7g. Thus, ports 5 and 8 are connected optically as are ports 6 and 7.

It is a characterisitic of the dihedral switch that the connection between two ports is made via two component paths, and that the two paths have different path lengths. Thus, for example, in FIGS. 11a–c, for the connection between ports 5 and 8, the path 5u-5p-5y-8y-8p-8u is shorter than the path 5u-5s-5x-8x-8s-8u, and in FIGS. 10a–c, for the connection between ports 5 and 6, the path 5u-5p-5y-6y-6p-6u is shorter than the path 5u-5s-5x-6x-6s-6u. This difference can be made very small, but in the application of the switch to signals of sufficiently high frequency, the difference in path length will cause degradation of the signals. This difference in path length can be eliminated in a simple manner if port module 5 is rotated by 180 degrees about the line F—F in FIG. 9 which is coplanar with and equidistant between beams 5x and 5y, while port module 7 is rotated by 180 degrees about the line E—E in FIG. 9 which is coplanar with and equidistant between beams 7x and 7y. By this change, beam 5x becomes collinear with beam 8y, while beam 5y becomes collinear with beam 8x, and the two paths 5u-5p-5y-8x-8s-8u and 5u-5s-5x-8y-8p-8u which then connect ports 5 and 8 have equal length. Similarly, the reflected portion of beam 5x becomes collinear with the reflected portion of beam 6y, while the reflected portion of beam 5y becomes collinear with the reflected portion of beam 6x, and the two paths 5u-5p-5y-6x-6s-6u and 5u-5s-5x-6y-6p-6u which then connect ports 5 and 6 have equal length. Such a switch is said to be equallized.

Bypass Switch

Figure 12:
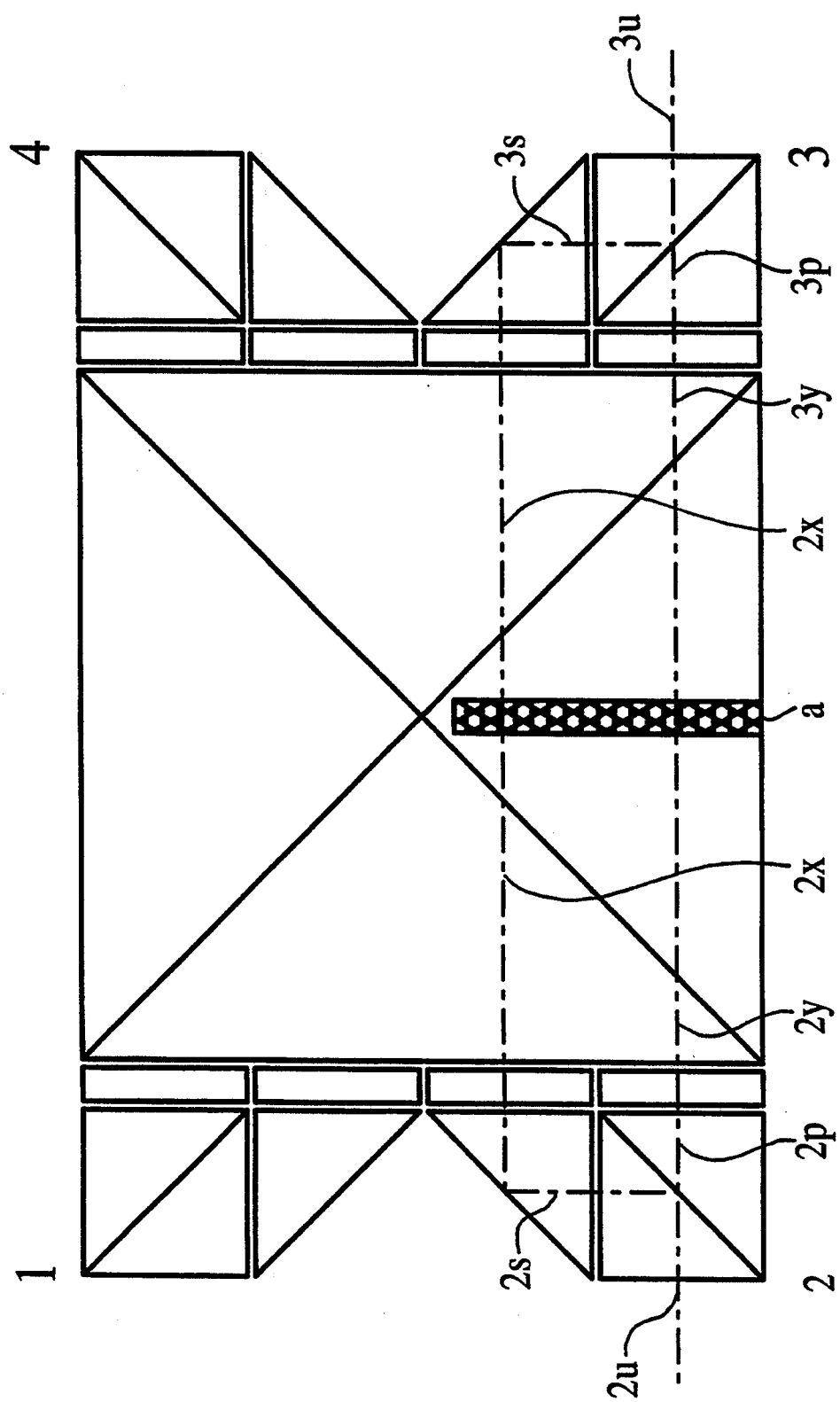
FIG. 12 is a schematic representation of the electro-optical switch of FIG. 6 showing a modification that specializes it for service as a bypass switch.

There exists a well known class of applications of 2×2 optical switches in which the switch operates as a bypass switch. One port of a bypass switch is connected to a receiver that receives information-carrying optical signals which reach it. Another port is connected to a transmitter that originates information-carrying optical signals. The receiver and transmitter are controlled by other apparatus to which they are connected electrically and which is collectively called a node. The other two ports are each connected to optical fibers which serve as conduits for information-carrying optical signals. One fiber is an input fiber which carries optical signals which originate at a first remote location. The other fiber is an output fiber which carries optical signals to a second remote location. The switch provides two states. In the first state, called the on-line state, the switch connects the input fiber to the receiver and connects the transmitter to the output fiber. Thus, the node can receive information through the input fiber and send information through the output fiber. In the second state, called the bypass state, the switch connects the input fiber to the output fiber. This state is used to route the optical signals from the input fiber, past the node and directly into the output fiber. The node is bypassed. The bypass state is used when problems develop with the node. However, in order to test the node, the bypass state must also connect the transmitter and the receiver. In order that the transmitter signal not saturate the receiver, some attenuation is desirable. FIG. 12 shows a modification of the normal planar switch which is useful as such a bypass switch. Attenuator a has been inserted in the plane where component paths 2x and 2y meet 3x and 3y, and the attenuator absorbs a fraction of the light propagating in those beams. To use this switch as a bypass switch, the receiver is attached to port 2 and the transmitter is attached to port 3, while the input fiber is attached to port 1 and the output fiber is attached to port 4. The absorption of absorber a is chosen to prevent the transmitter from saturating the receiver, and it also reduces the crosstalk between the transmitter and the receiver when the switch is in the on-line state. It will be evident to those skilled in the art that an attenuator may be placed in the dihedral switch at a corresponding position, thus enabling that switch also to function as a bypass switch.

Modified Switches

There are two methods which can be applied to the normal planar switch or to the dihedral switch so as to modify them and produce new, related switches. The first of these methods is to replace one or more of the switch's port modules of the type shown in FIG. 1 by an augmented port module of the type shown in FIG. 3 or by a repolarized port module of the type shown in FIG. 4 or FIG. 5. Switches constructed in this manner will exhibit still lower crosstalk than switches which contain the standard type of port module.

The second of the two methods is to fold the normal planar switch or the dihedral switch to produce alternate switches that are called folded switches. Folding exploits the symmetry of a switch: a switch which has a plane of mirror symmetry can usually be folded about an axis lying in that plane to produce a folded switch. Folding consists of dividing the switch at the plane of symmetry and then moving and reorienting one of the two halves alongside the other. After this operation is complete, the optical paths that have been thereby severed at the former plane of mirror symmetry are reconnected by adding reflectors to restore the continuity of the paths.

Figure 13:
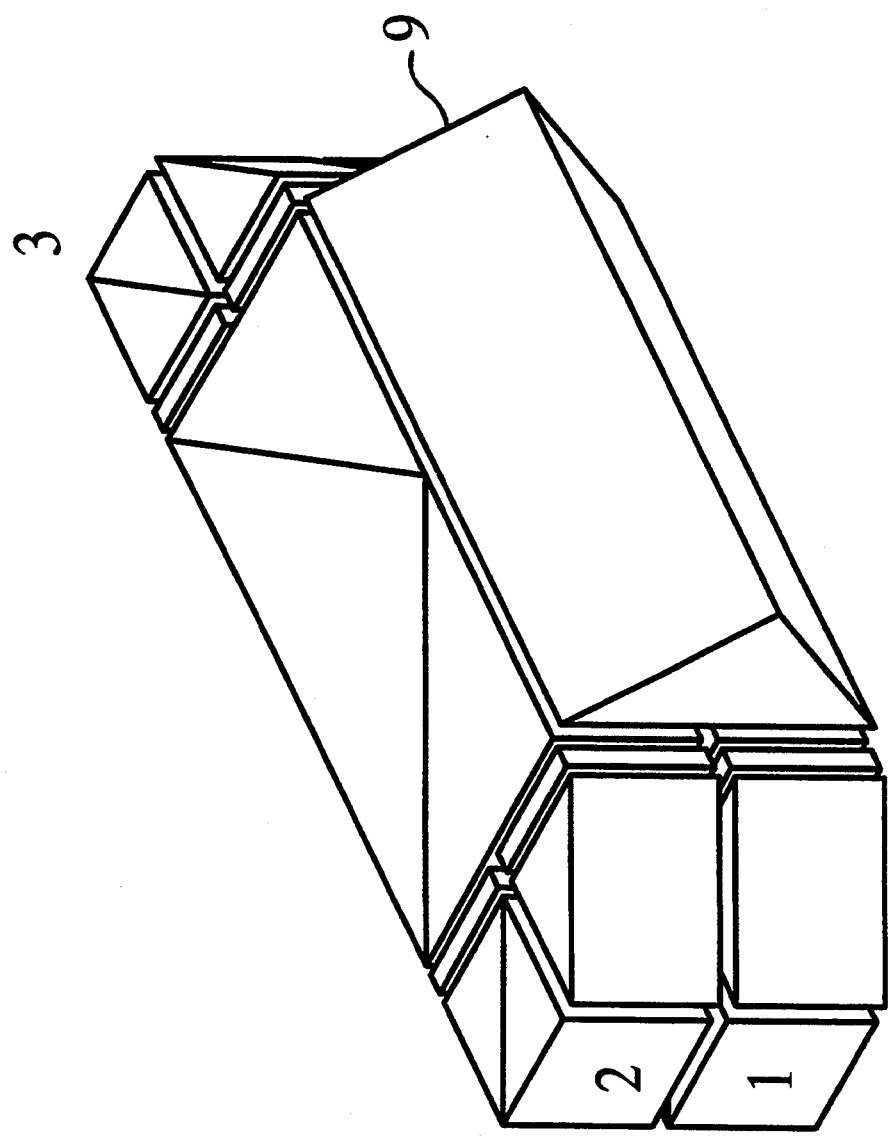
FIG. 13 is a schematic representation of a first folded switch based on the electro-optical switch of FIG. 6.
Figure 14:
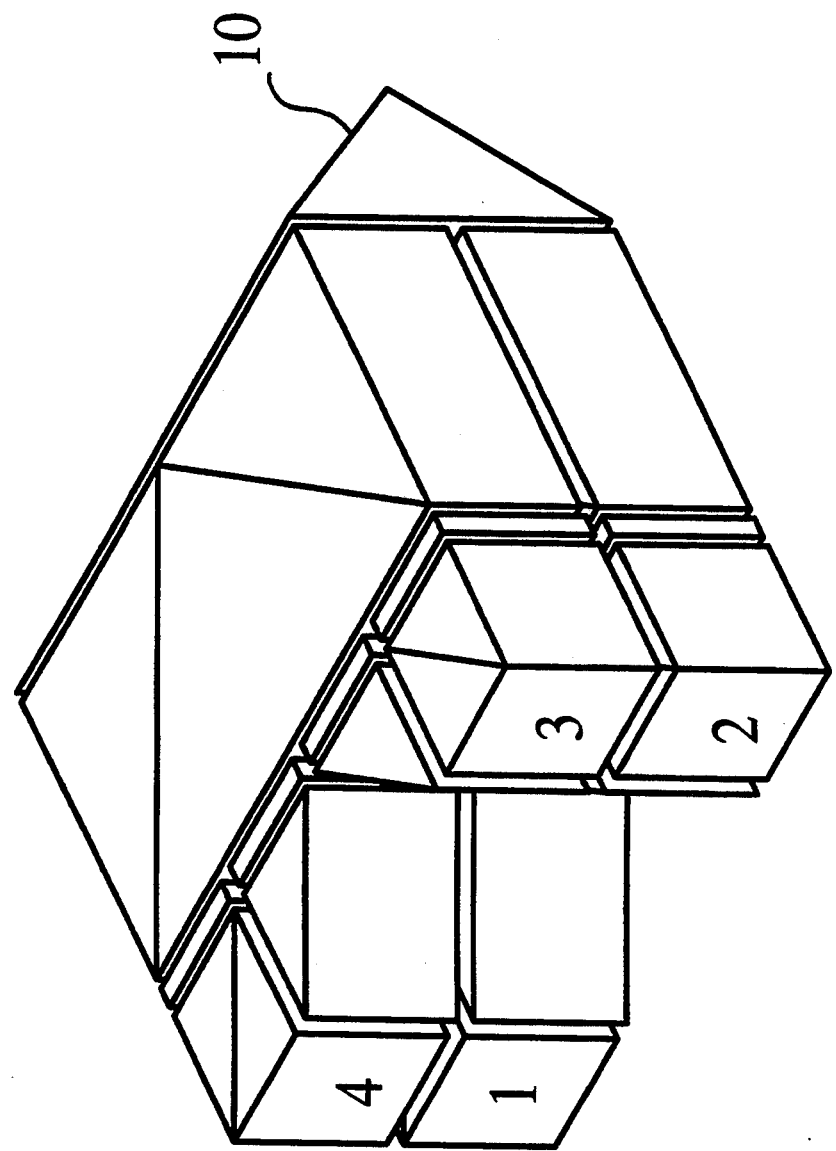
FIG. 14 is a schematic representation of a second folded switch based on the electro-optical switch of FIG. 6.
Figure 15:
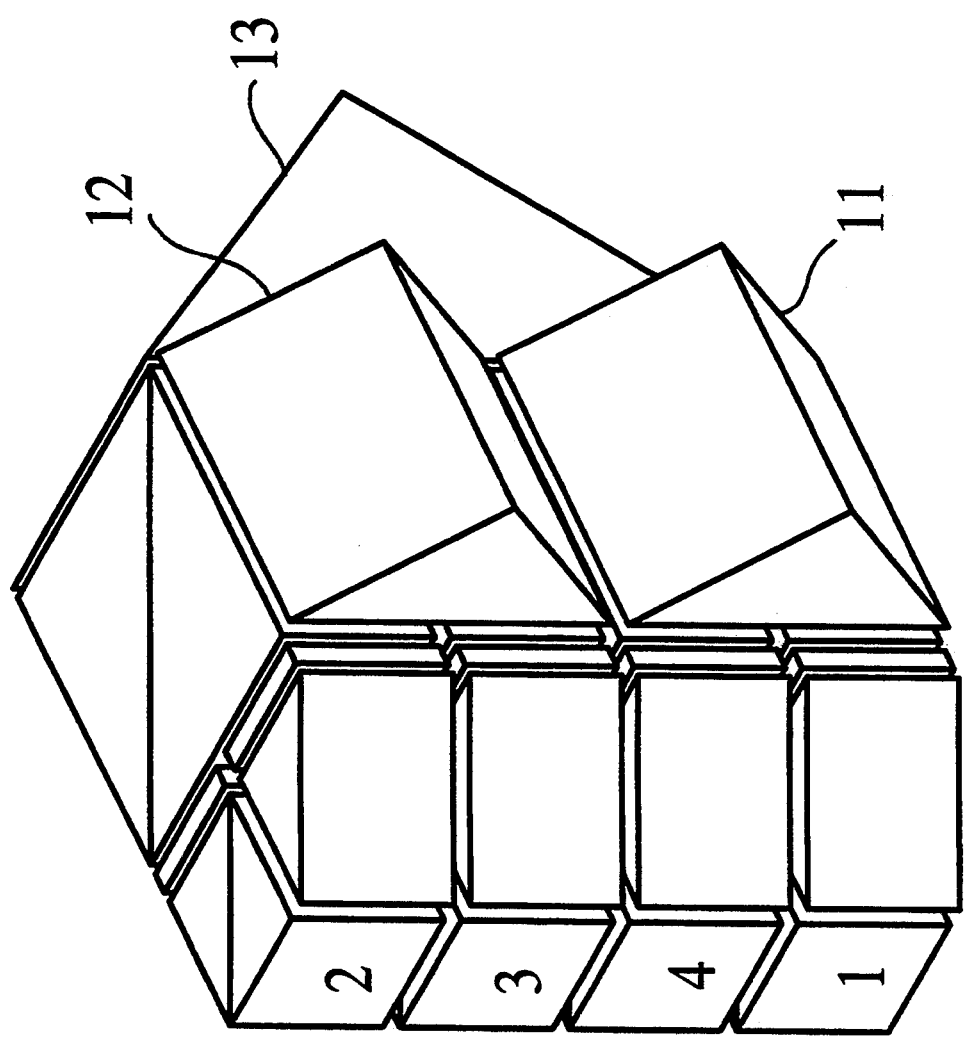
FIG. 15 is a schematic representation of a third folded switch based on the electro-optical switch of FIG. 6.

In the case of the normal planar switch, there are three planes of mirror symmetry. The first symmetry plane is shown as the dashed line A—A of FIG. 6. When the normal planar switch is folded with respect to this plane, the result is the switch shown in FIG. 13. Auxiliary prism 9 has been added to reconnect the optical paths severed by the folding operation. The second symmetry plane is shown as the dashed line B—B of FIG. 6. When the normal planar switch is folded with respect to this plane, the result is the switch of FIG. 14. Auxiliary prism 10 has been added to reconnect the optical paths which were severed by the folding operation. The normal planar switch can also be folded with respect to these two symmetry planes in succession, and the result is the switch of FIG. 15. Auxiliary prisms 11, 12, and 13 have been added to reconnect the optical paths that were severed by the folding operation. The third plane is the plane of FIG. 6, but there are no folded switches that are derived from this plane.

Figure 16:
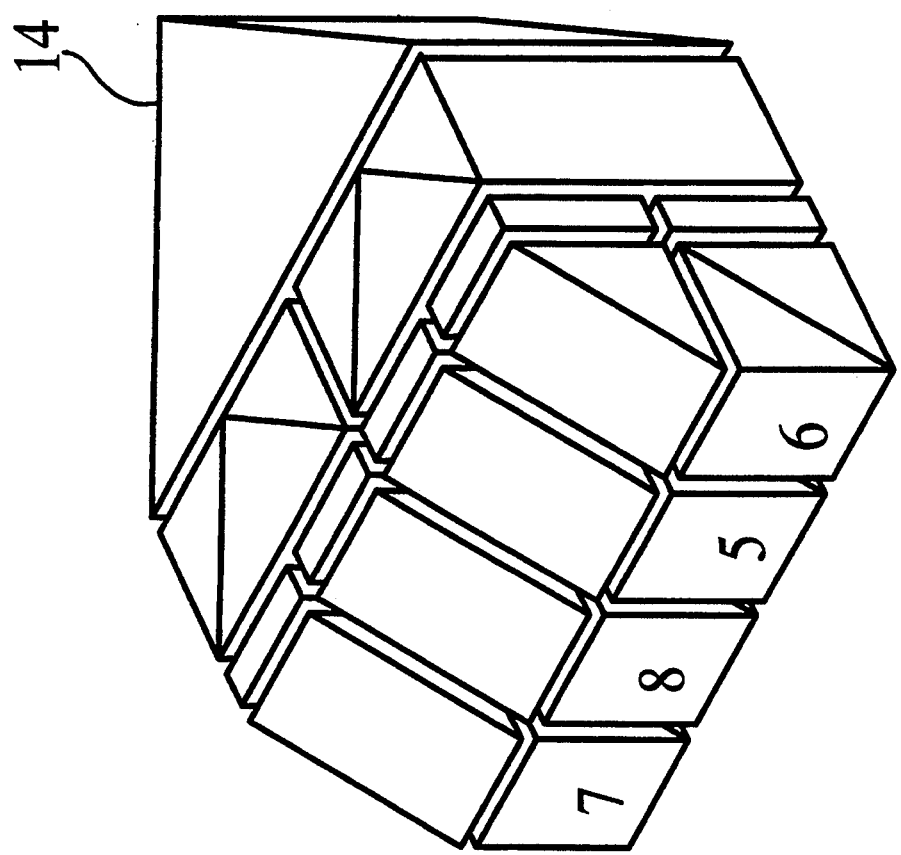
FIG. 16 is a schematic representation of a first folded switch based on the electro-optical switch of FIG. 9.
Figure 17:
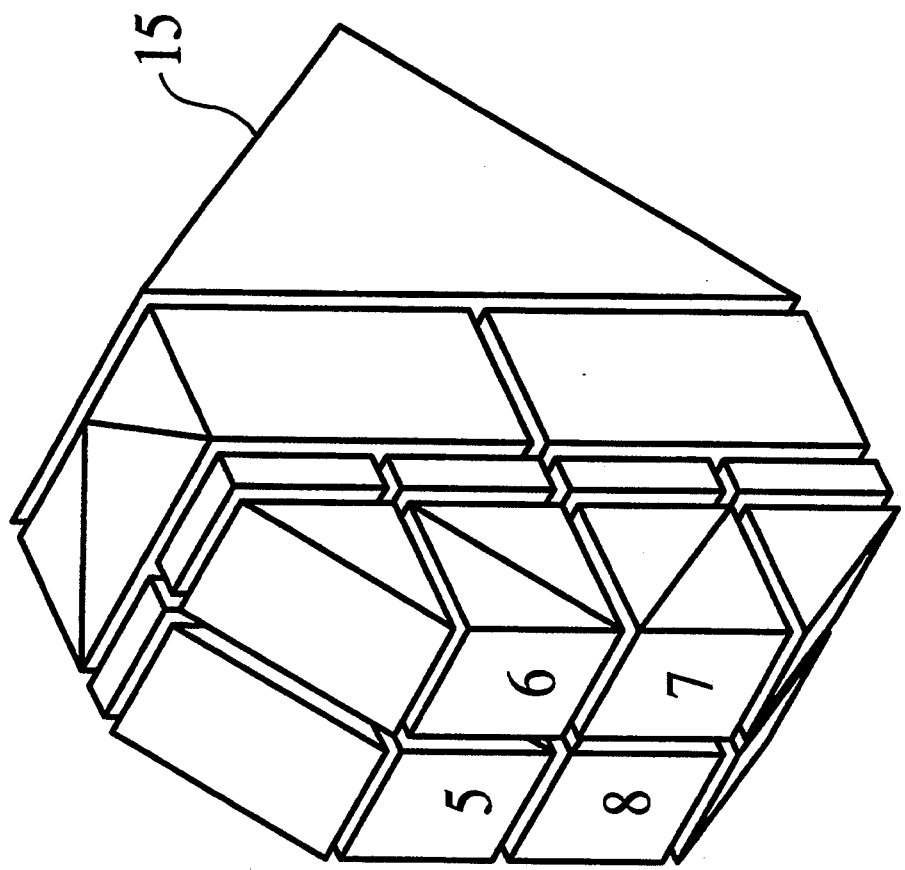
FIG. 17 is a schematic representation of a second folded switch based on the electro-optical switch of FIG. 9.

In the case of the dihedral switch, there are two planes of mirror symmetry. The first plane is shown as the dashed line G—G in FIG. 11b. When the dihedral switch is folded with respect to this plane, the result is the switch of FIG. 16. Auxiliary prism 14 has been added to reconnect the optical paths which were severed by the folding operation. The second plane is shown as the dashed line H—H in FIG. 11c. When the dihedral switch is folded with respect to this plane, the result is the switch of FIG. 17. Auxiliary prism 15 has been added to reconnect the optical paths which were severed by the folding operation.

While all four equivalent switches based on the planar switch have the same crosstalk characteristics, and all three switches based on the dihedral switch have the same but different crosstalk characteristics, the different physical configurations enable the switches to be built from different numbers of parts and by different construction practices, thereby selectively adapting each to different circumstances and applications. Still further useful variations can be realized by folding the modified planar and the modified dihedral switches that have been disclosed above. These modified switches can equalize the path lengths for the orthogonal polarizations; they can yield still lower crosstalk characteristics through the application of augmented or re-polarized port modules; and they can provide bypass switches through selective attenuation of one or more optical paths. The application of four augmented or re-polarized port modules does not eliminate the symmetry of the planar and dihedral switches, so the transformations of changing the port modules and performing the various foldings can be accomplished in any order. The equalization of path lengths and the application of attenuation, on the other hand, eliminate one or two of the symmetry planes used in folding both the planar and the dihedral switches. Thus, it is may be desirable to perform the folding before path equalization or attenuation, so that the language regarding the symmetry of the switches that has been used in the description above of the folded switches will remain applicable for these folded and modified switches.

Figure 18:
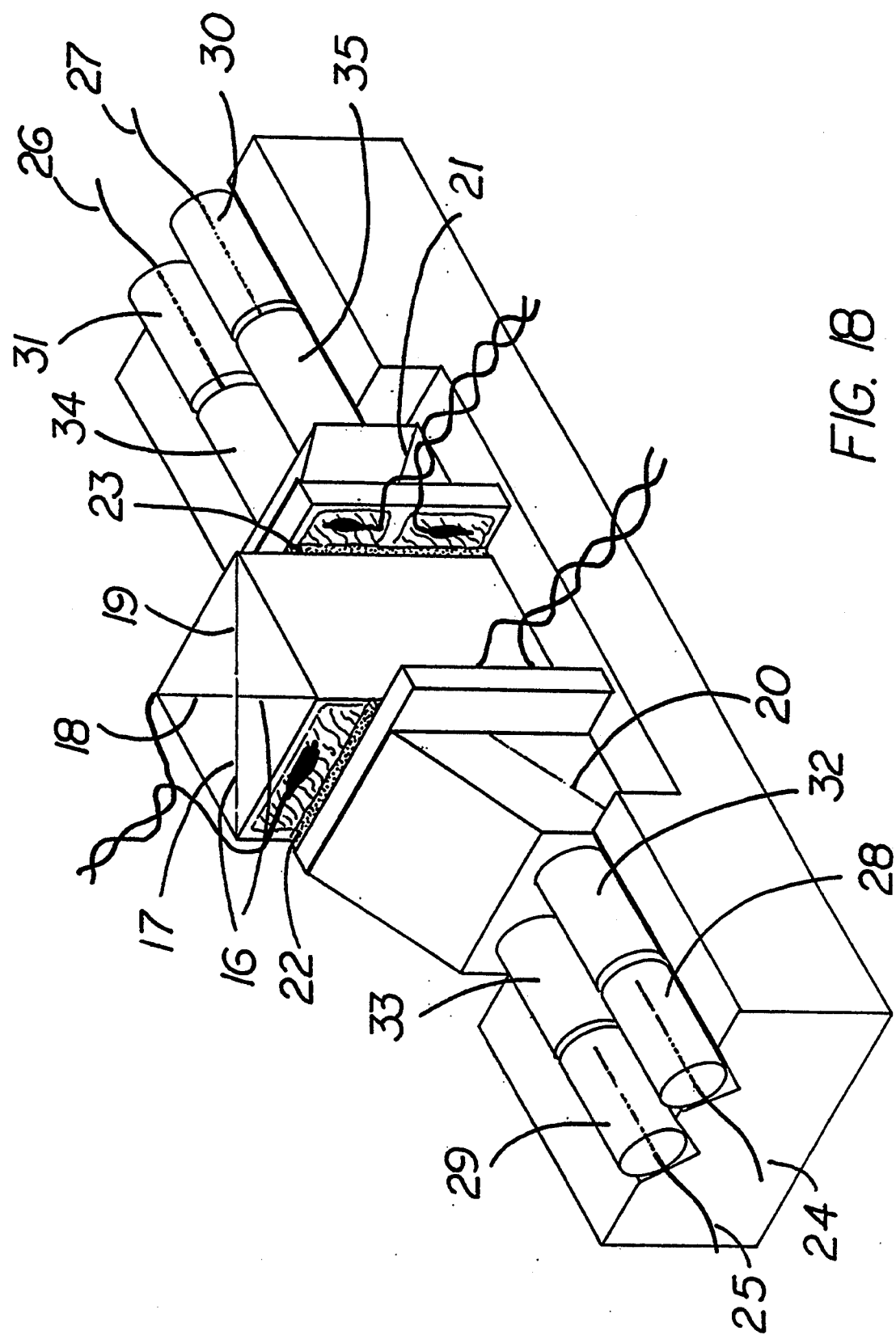
FIG. 18 is a pictorial diagram of an electro-optical switch constructed in accordance with the present invention.

Several prototype electro-optical switches of the dihedral type have been constructed in accordance with the present invention. FIG. 18 shows a sketch of one prototype switch. The polarizing beam splitter films 16, 17, 18, 19, 20, and 21 are held at the interfaces between glass prisms. The electro-optical retarders consist of two separate half-wave films 22 and 23 made with a ferroelectric liquid crystal. The optical input and output signal sources for the prototype are four optical fibers 24, 25, 26, and 27 carrying light having a wavelength of 830 nm. Each fiber was placed inside a glass capillary tube 28, 29, 30, and 31 and the ends were polished. Each end was then located adjacent to the end of gradient index rod lenses 32, 33, 34, and 35 which collimate the light issuing from the input fibers and focuses collimated light into receiving fibers. The components are all bonded to a single platform 36 to hold them together. The crosstalk characteristic of the prototype was measured according to standard procedures and was found to average −22.3 dB while the switches were held in the first switch state and to average −27.6 dB while the switches were held in the second switch state. The insertion loss averaged 2.98 dB in the first switch state, and it averaged 2.11 dB in the second switch state. The switching time to change states was measured to be approximately 50 microseconds when the driving voltage on the electro-optical retarders was 15 volts.

Those skilled in the art will readily appreciate the fact that there exist other switches which are not shown in the drawings and which are not explicitly described herein but which may be derived from the embodiments shown by still other combinations of the operations of modification, equalization, and folding described hereinabove. These and certain other changes may be made in the above-described embodiments without departing from the scope of the invention, and those skilled in the art may make yet other changes according to the teachings herein. Therefore, it is intended that all subject matter contained in the above written description or shown in the accompanying drawings shall be interpreted as illustrative and not in a limiting sense.

I claim:

1. An optical switch enabling electrically selectable routing of optical signals among four bidirectional signal paths, said optical switch comprising:
   four port modules each conducting one bi-directional beam of collimated light into and out of the switch, each port module comprising:
   one primary polarizing beam splitter means disposed to intercept the beam of collimated light and to reversibly divide the beam into a pair of component beams comprising one reflected component beam having a first linear polarization and one transmitted component beam having a second linear polarization orthogonal to the first;

one light deflecting means disposed to intercept and deflect the reflected component beam into a path parallel to the transmitted component beam; and two electro-optic means, comprising separate regions of at least one electro-optic device, each with means for applying an electrical signal and each disposed to intercept and transmit one of the component beams, each electro-optic means having a first state which changes the linear polarization of an incident component beam to the orthogonal linear polarization and a second state in which the linear polarization of the incident component beam is left unchanged, said first and second states being selected in accordance with an electrical signal applied to the electro-optic means;

said optical switch further comprising eight secondary polarizing beam splitter means comprising separate regions of at least one polarizing beam splitter device, each disposed to intercept one component beam, each polarizing beam splitter means causing the incident component beam to be transmitted when it has a particular one of the mutually orthogonal linear polarizations and to be reflected when it has another of the mutually orthogonal linear polarizations, said transmitted light comprising a secondary transmitted beam and said reflected light comprising a secondary reflected beam, said secondary reflected and transmitted beams of each port module each being collinear and directed toward transmitted or reflected beams of the other port modules.

2. An optical switch as in claim 1 wherein said port modules and secondary polarizing beam splitter means are mutually disposed so as to cause the secondary transmitted beams of a first port module to be collinear with and connected to the secondary transmitted beams of a fourth port module and to cause the secondary transmitted beams of a second port module to be collinear with and connected to the secondary transmitted beams of a third port module and to cause the secondary reflected beams of said first port module to be collinear with and connected to the secondary reflected beams of said second port module and to cause the secondary reflected beams of said third port module to be collinear with and connected to the secondary reflected beams of said fourth port module.

3. An optical switch as in claim 2 wherein the port modules are selectably connected in pairs and mutually positioned and oriented such that the reflected component beam of each port module of a connected pair of port modules is connected through secondary component beams to the transmitted component beam of the other port module of a connected pair of port modules so as to make equal the optical lengths of two optical paths connecting each connected pair of port modules.

4. An optical switch as in claim 2 wherein the electro-optic means comprises at least one liquid crystal material disposed between optically transparent conductive electrodes.

5. An optical switch as in claim 4 wherein the liquid crystal material comprises a ferroelectric liquid crystal material.

6. An optical switch as in claim 2 further comprising linear polarizer means disposed between said primary polarizing beam splitter means and said electro-optic means for intercepting at least one component beam.

7. An optical switch as in claim 2 further comprising two light attenuation means, one said light attenuation means disposed to intercept the secondary transmitted beam of the transmitted beam associated with one of the ports and the second said light attenuation means disposed to intercept the secondary transmitted beam of the reflected beam associated with the same port and to attenuate the beams so intercepted.

8. An optical switch as in claim 2 further comprising fixed half-wave retarder means disposed between said primary polarizing beam splitter means and said electro-optic means, said fixed retarder means further disposed to intercept exactly one component beam and oriented to change the linear polarization of the incident component beam to the orthogonal linear polarization.

9. An optical switch as in claim 1 wherein said four port modules and secondary polarizing beam splitter means are mutually disposed so as to cause the secondary transmitted beams of a first port module to be collinear with and connected to the secondary transmitted beams of a fourth port module and to cause the secondary transmitted beam of a second port module to be collinear with and connected to the secondary transmitted beams of a third port module;

said optical switch further comprising eight secondary reflectors, each disposed to intercept and deflect one secondary reflected beam and further mutually disposed to cause the secondary reflected beams of said first port module to be collinear with and connected to the secondary reflected beams of said second port module and to cause the secondary reflected beams of said third port module to be collinear with and connected to the secondary reflected beams of said fourth port module.

10. An optical switch as in claim 9 wherein the port modules are selectably connected in pairs and mutually positioned and oriented such that the reflected component beam of each port module of a connected pair of port modules is connected through secondary component beams to the transmitted component beam of the other port module of a connected pair of port modules so as to make equal the optical lengths of two optical paths connecting each connected pair of port modules.

11. An optical switch as in claim 9 wherein the electro-optic means comprises at least one liquid crystal material disposed between optically transparent conductive electrodes.

12. An optical switch as in claim 11 wherein the liquid crystal material comprises a ferroelectric liquid crystal material.

13. An optical switch as in claim 9 further comprising linear polarizer means disposed between said primary polarizing beam splitter means and said electro-optic means for intercepting at least one component beam.

14. An optical switch as in claim 9 further comprising two light attenuation means, one said light attenuation means disposed to intercept the secondary transmitted beam of the transmitted beam associated with one of the ports and the second said light attenuation means disposed to intercept the secondary transmitted beam of the reflected beam associated with the same port and to attenuate the beams so intercepted.

15. An optical switch as in claim 9 further comprising fixed half-wave retarder means disposed between said primary polarizing beam splitter means and said electro-optic means, said fixed retarder means further disposed to intercept exactly one component beam and oriented to change the linear polarization of the incident component beam to the orthogonal linear polarization.

16. An optical switch as in claim 1 wherein said four port modules and secondary polarizing beam splitter means are mutually disposed so as to cause the secondary reflected beams of a first port module to be collinear with and connected to the secondary reflected beams of a fourth port module and to cause the secondary reflected beams of a second port module to be collinear with and connected to the secondary reflected beams of a third port module;

said optical switch further comprising eight secondary reflectors, each disposed to intercept and deflect one secondary transmitted beam and further mutually disposed to cause the secondary transmitted beams of said first port module to be collinear with and connected to the secondary transmitted beams of said second port module and to cause the secondary transmitted beams of said third port module to be collinear with and connected to the secondary transmitted beams of said fourth port module.

17. An optical switch as in claim 16 wherein the port modules are selectably connected in pairs and mutually positioned and oriented such that the reflected component beam of each port module of a connected pair of port modules is connected through secondary component beams to the transmitted component beam of the other port module of a connected pair of port modules so as to make equal the optical lengths of two optical paths connecting each connected pair of port modules.

18. An optical switch as in claim 16 wherein the electro-optic means comprises at least one liquid crystal material disposed between optically transparent conductive electrodes.

19. An optical switch as in claim 18 wherein the liquid crystal material comprises a ferroelectric liquid crystal material.

20. An optical switch as in claim 16 further comprising linear polarizer means disposed between said primary polarizing beam splitter means and said electro-optic means for intercepting at least one component beam.

21. An optical switch as in claim 16 further comprising two light attenuation means, one said light attenuation means disposed to intercept the secondary transmitted beam of the transmitted beam associated with one of the ports and the second said light attenuation means disposed to intercept the secondary transmitted beam of the reflected beam associated with the same port and to attenuate the beams so intercepted.

22. An optical switch as in claim 16 further comprising fixed half-wave retarder means disposed between said primary polarizing beam splitter means and said electro-optic means, said fixed retarder means further disposed to intercept exactly one component beam and oriented to change the linear polarization of the incident component beam to the orthogonal linear polarization.

23. An optical switch as in claim 1 further comprising:

eight secondary reflectors, each disposed to intercept and deflect one secondary reflected beam and further mutually disposed to cause the secondary reflected beams of a first port module to be collinear with and connected to the secondary reflected beams of a fourth port module and to cause the secondary reflected beams of a second port module to be collinear with and connected to the secondary reflected beams of a third port module; and eight tertiary reflectors, each disposed to intercept and deflect one secondary transmitted beam and further mutually disposed to cause the secondary transmitted beams of said first port module to be collinear with and connected to the secondary transmitted beams of said second port module and to cause the secondary transmitted beams of said third port module to be collinear with and connected to the secondary transmitted beams of said fourth port module.

24. An optical switch as in claim 23 wherein the port modules are selectably connected in pairs and mutually positioned and oriented such that the reflected component beam of each port module of a connected pair of port modules is connected through secondary component beams to the transmitted component beam of the other port module of a connected pair of port modules so as to make equal the optical lengths of two optical paths connecting each connected pair of port modules.

25. An optical switch as n claim 23 wherein the electro-optic means comprises at least one liquid crystal material disposed between optically transparent conductive electrodes.

26. An optical switch as in claim 25 wherein the liquid crystal material comprises a ferroelectric liquid crystal material.

27. An optical switch as in claim 23 further comprising linear polarizer means disposed between said primary polarizing beam splitter means and said electro-optic means for intercepting at least one component beam.

28. An optical switch as in claim 23 further comprising two light attenuation means, one said light attenuation means disposed to intercept the secondary transmitted beam of the transmitted beam associated with one of the ports and the second said light attenuation means disposed to intercept the secondary transmitted beam of the reflected beam associated with the same port and to attenuate the beams so intercepted.

29. An optical switch as in claim 23 further comprising fixed half-wave retarder means disposed between said primary polarizing beam splitter means and said electro-optic means, said fixed retarder means further disposed to intercept exactly one component beam and oriented to change the linear polarization of the incident component beam to the orthogonal linear polarization.

30. An optical switch as in claim 1 wherein the port modules are selectably connected in pairs and mutually positioned and oriented such that the reflected component beam of each port module of a connected pair of port modules is connected through secondary component beams to the transmitted component beam of the other port module of a connected pair of port modules so as to make equal the optical lengths of two optical paths connecting each connected pair of port modules.

31. An optical switch as in claim 1 wherein the electro-optic means comprises at least one liquid crystal material disposed between optically transparent conductive electrodes.

32. An optical switch as in claim 31 wherein the liquid crystal material comprises a ferroelectric liquid crystal material.

33. An optical switch as in claim 1 further comprising linear polarizer means disposed between said primary polarizing beam splitter means and said electro-optic means for intercepting at least one component beam.

34. An optical switch as in claim 1 further comprising two light attenuation means, one said light attenuation means disposed to intercept the secondary transmitted beam of the transmitted beam associated with one of the ports and the second said light attenuation means disponsed to intercept the secondary transmitted beam of the reflected beam associated with the same port and to attenuate the beams so intercepted.

35. An optical switch as in claim 1 further comprising fixed half-wave retarder means disposed between said primary polarizing beam splitter means and said electro-optic means, said fixed retarder means further disposed to intercept exactly one component beam and oriented to change the linear polarization of the incident component beam to the orthogonal linear polarization.

* * * * *